United States Patent
Lee

(10) Patent No.: US 7,286,114 B2
(45) Date of Patent: Oct. 23, 2007

(54) TRACK BALL STRUCTURE

(75) Inventor: Shih-Yang Lee, Hsinchu (TW)

(73) Assignee: Lite-On Technology Corporation, Taipei (TW)

( * ) Notice: Subject to any disclaimer, the term of this patent is extended or adjusted under 35 U.S.C. 154(b) by 620 days.

(21) Appl. No.: 10/784,269

(22) Filed: Feb. 24, 2004

(65) Prior Publication Data

US 2005/0184962 A1     Aug. 25, 2005

(51) Int. Cl.
*G09G 5/08* (2006.01)

(52) U.S. Cl. ...................... 345/163; 345/156

(58) Field of Classification Search ........ 345/156–167, 345/168–174, 856–862; 348/734; 463/37.38
See application file for complete search history.

(56) References Cited

U.S. PATENT DOCUMENTS

| | | | | |
|---|---|---|---|---|
| 5,287,090 A | * | 2/1994 | Grant | 345/163 |
| 5,920,307 A | * | 7/1999 | Blonder et al. | 345/167 |
| 6,097,372 A | * | 8/2000 | Suzuki | 345/167 |
| 6,172,665 B1 | * | 1/2001 | Bullister | 345/163 |
| 7,081,883 B2 | * | 7/2006 | Chen | 345/163 |

\* cited by examiner

*Primary Examiner*—Nitin I. Patel
(74) *Attorney, Agent, or Firm*—Rosenberg, Klein & Lee

(57) ABSTRACT

A track ball structure for controlling movements of a cursor comprises a body, a capacity in the body, a track ball housed in the capacity having a portion exposed outside the capacity for controlling the movements of the cursor, and a plurality of sensors located in the capacity surrounding the track ball for detecting pressure directions. When the track ball is rollable continuously in a selected direction to compress the sensors so that the cursor is moved continuously in the selected direction. Thus, the track ball structure uses less part of a hand to control the track ball simply, conforms to human engineering, and moves the cursor to an objective position in a short time.

10 Claims, 3 Drawing Sheets

TRACK BALL STRUCTURE

FIELD OF THE INVENTION

The present invention relates to a track ball structure adopted for use on a mouse or positioning device that has a track ball to control the position of a cursor on the computer screen.

BACKGROUND OF THE INVENTION

Since Apple Computer Corporation introduced the mouse in 1984, it has become an indispensable input device to control personal computers. It is called mouse mainly because of its shape and wire.

The general mouse has a track ball which has a portion exposed outside. When the track ball is rolled by force, two circular disks located in the mouse normal to each other will be turned with the track ball. Meanwhile, through optical detection, the turning speed of the two circular disks will be transformed to a moving distance on the perpendicular coordinates. Hence on the electronic equipment connected to the mouse, a cursor on the screen will be moved from an initial position to an objective position. For such a mouse, the force being applied to move the mouse is through the wrist of a user's hand. Operation in such a way for a long period of time could cause ache and injure the wrist.

In order to satisfy users' working types and their computer habits, there are constant innovations and improvements on the design of the mouse, and a wide variety of mice has been developed and introduced. They have different features and different functions.

Often, a mouse adopts an optical structure or a mechanical structure with the track ball on the bottom of the mouse body. Another design places the track ball on an upper side of the mouse body newly, so that the track ball may be rolled by fingers to move the cursor or provide other functions. Thus the design resolves the problem of desktop space constraint during mouse movement, and the problem of preventing dust on the desktop from being carried into the mouse. However, the track ball still has to be rolled by fingers continuously for moving the cursor from the initial position to the objective position. Although they are more convenient to use, they still could cause ache or injury to user's fingers when used for a long period of time.

Moreover, the technique of using a joystick to control the cursor has been developed later. Pushing the joystick can control and move the cursor to the objective position without continuously rolling the track ball. But when the joystick is pushed and released, it returns to the center position and gives the finger pressure. The further away it is being pushed, the greater the pressure it exerts on the finger. This also hurts the finger when used for a long period of time.

SUMMARY OF THE INVENTION

The primary object of the invention is to provide a track ball structure that is operable in a simple way with less hand control and conforms to the human body, and can move the cursor to an position in a short time.

The track ball structure according to the invention aims to control the motion of a cursor. It includes a body, a capacity, a track ball and a plurality of sensors. The capacity is located in the body. The track ball is housed in the capacity and has a portion exposed outside the capacity to control the motion of the cursor. The sensors are located in the capacity surrounding the track ball to detect the pressure direction. When the track ball is rolled, it continuously compresses the sensors in one direction, thereby the cursor is moved continuously in that direction. When the track ball is released, the cursor stops moving. Thus the cursor is moved to an objective position in a simple way in the shortest time with less hand control. It also conforms to the human body.

The foregoing, as well as additional objects, features and advantages of the invention will be more readily apparent from the following detailed description, which proceeds with reference to the accompanying drawings.

DESCRIPTION OF THE PREFERRED EMBODIMENTS

The track ball structure according to the invention is adopted for use on a mouse or positioning device (such as notebook computer) that has a track ball. The mouse or positioning device includes at least a body, track ball, cursor control element, electric signal sensor device and electric signal-transmitting device. When the track ball is rolled, the electric signal sensor device generates a corresponding electric signal. The electric signal-transmitting device transmits the electric signal to the cursor control element and the electronic equipment to control the position of the cursor. The operation principle of the mouse or positioning device that equips with a track ball is known in the art, details are omitted.

Figure 1:
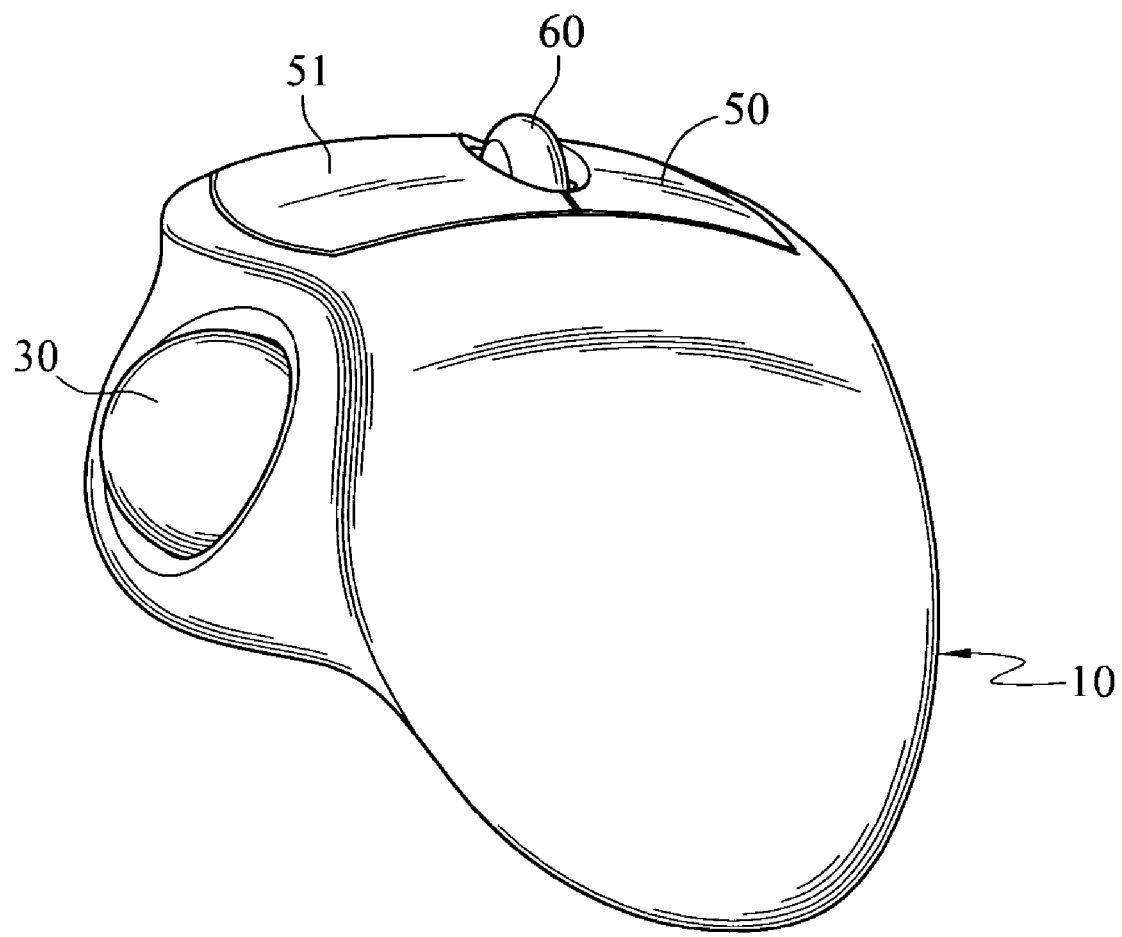
FIG. 1 is a perspective view of the first embodiment of the invention.
Figure 2:
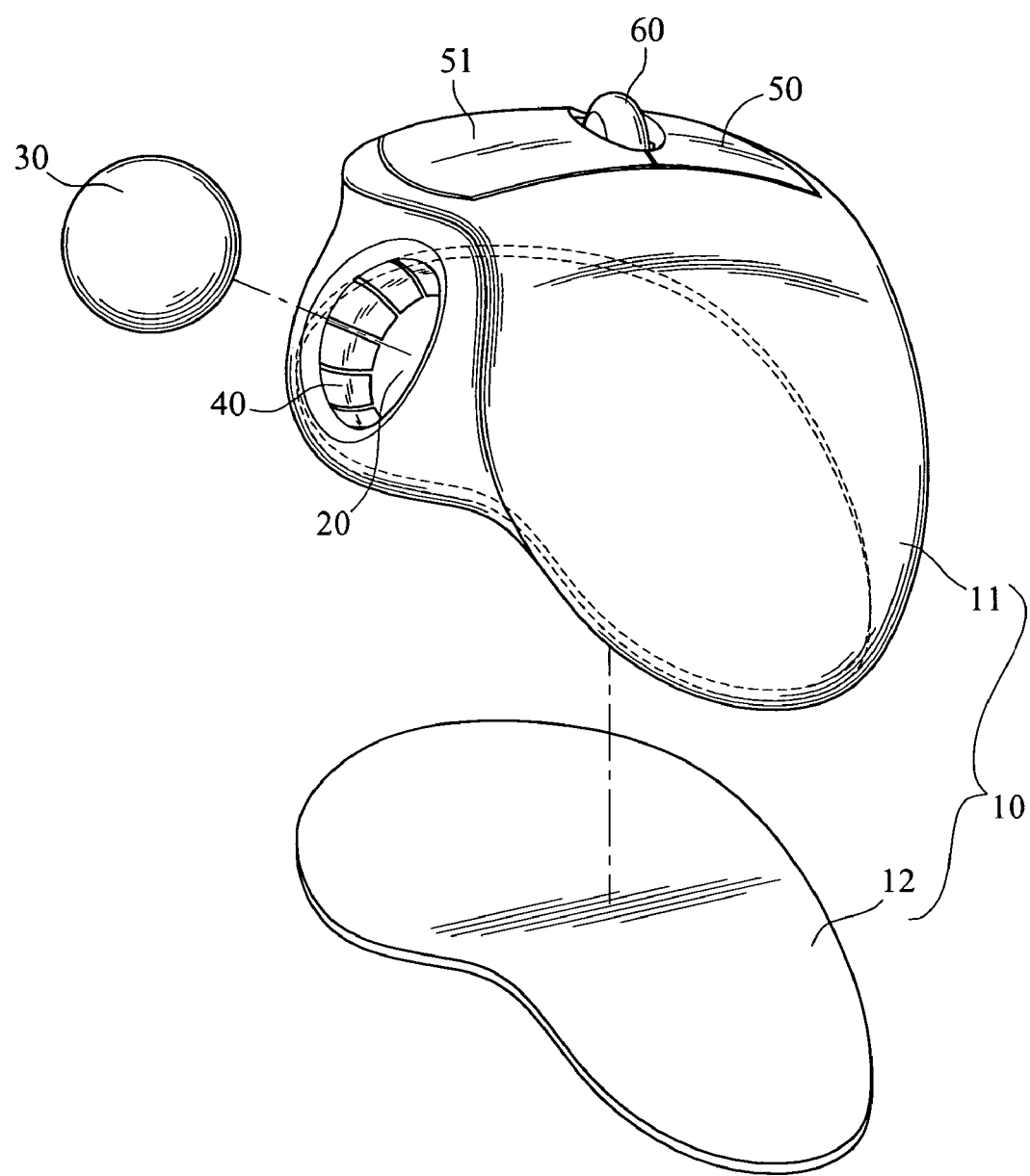
FIG. 2 is an exploded view of the first embodiment of the invention.

Refer to FIGS. 1 and 2 for a first embodiment of the invention. The track ball structure according to the invention aims to control the motion of a cursor. It mainly includes a body 10, a capacity 20, a track ball 30 and sensors 40.

The body 10 consists of an upper shell 11 and a base 12. The upper shell 11 is formed in a convex and curved shape to facilitate hand grasping and controlling and conform to the design concept of human engineering. The upper shell 11 has a first button switch 50 and a second button switch 51 located on a front side bordering the edge thereof. A rolling wheel 60 is located between the first button switch 50 and the second button switch 51. The rolling wheel 60 is used to scroll the window on a screen upwards and downwards.

The capacity 20 is located on the left side of the body 10. The track ball 30 is housed in the capacity 20 and has a portion exposed outside the capacity to control the motion of the cursor. The sensors 40 are button key detection devices and are arranged in a juxtaposed manner close to one another, and are housed in the capacity 20 surrounding the track ball 30 to detect the pressure direction. When the track ball 30 is rolled and continuously compresses the sensors 40 in one direction, the cursor will be moved continuously in that direction.

Figure 3:
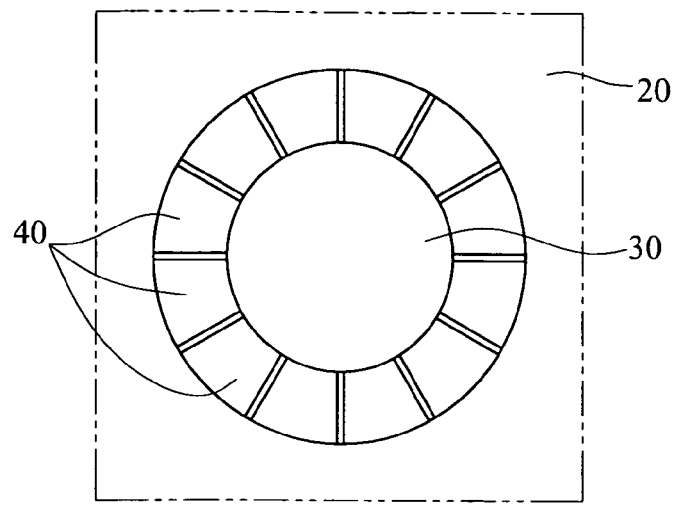
FIG. 3 is a schematic view of the capacity of the invention.

Refer to FIG. 3 for the capacity. The track ball 30 is located in the center of the capacity 20. The sensors 40 are arranged in a juxtaposed manner close to one another, and are housed in the capacity surrounding the track ball 30 to form a closed sensor assembly. The number of the sensors 40 depends on the perimeter of the track ball 30. In this embodiment, twelve sensors 40 in total are used to surround the track ball 30.

Figure 4:
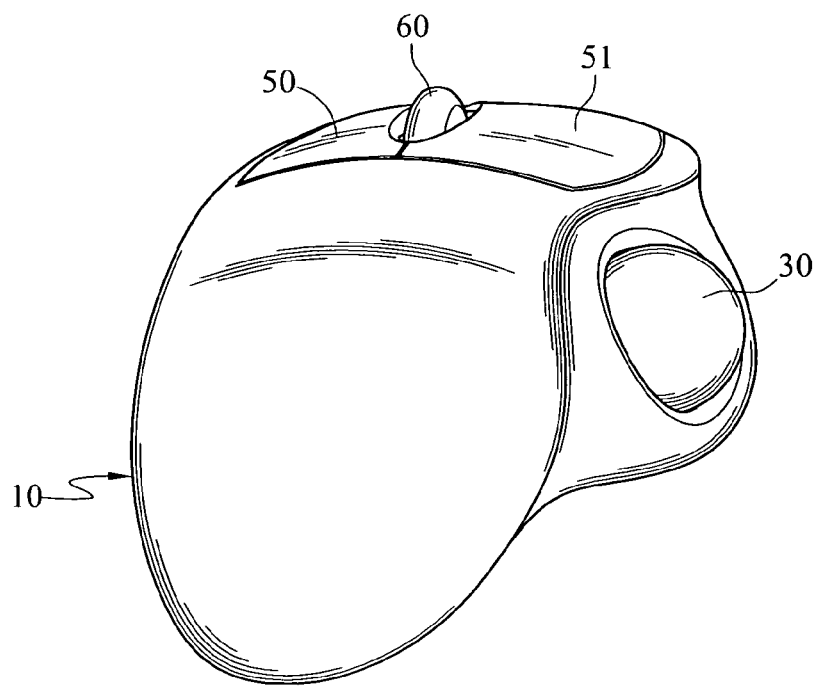
FIG. 4 is a perspective view of the second embodiment of the invention.

Refer to FIG. 4 for a second embodiment of the invention. This embodiment aims to provide a track ball structure to control a cursor for left-handed users. Similarly the track ball structure according to the invention aims to control the motion of the cursor. It mainly includes a body 10, a capacity 20, a track ball 30 and sensors 40. Please also refer to FIG. 2 for the structure of the track ball structure.

The body 10 consists of an upper shell 11 and a base 12. The upper shell 11 is formed in a convex and curved shape to facilitate hand grasping and controlling and conform to the design concept of human engineering. The upper shell 11 has a first button switch 50 and a second button switch 51 located on a front side bordering the edge thereof. A rolling wheel 60 is located between the first button switch 50 and the second button switch 51. The rolling wheel 60 is used to scroll the window on a screen upwards and downwards.

The capacity 20 is located on the right side of the body 10. The track ball 30 is housed in the capacity 20 and has a portion exposed outside the capacity to control the motion of the cursor. The sensors 40 are button key detection devices and are arranged in a juxtaposed manner close to one another, and are housed in the capacity surrounding the track ball 30 to detect the pressure direction. When the track ball 30 is rolled and continuously compresses the sensors 40 in one direction, the cursor will be moved continuously in that direction.

Refer to FIG. 3 for the capacity. The track ball 30 is located in the center of the capacity 20. The sensors 40 are arranged in a juxtaposed manner close to one another, and are housed in the capacity 20 surrounding the track ball 30 to form a closed sensor assembly. The number of sensors 40 depends on the perimeter of the track ball 30. In this embodiment, twelve sensors 40 in total are used to surround the track ball 30.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments, which do not depart from the spirit and scope of the invention.

What is claimed is:

1. A track ball structure for controlling movements of a cursor, comprising:
   a body;
   a capacity located in the body;
   a track ball housed in the capacity having a portion exposed outside the capacity for controlling the movements of the cursor; and
   a plurality of sensors located in the capacity surrounding the track ball for detecting pressure directions;
   wherein the track ball is rollable continuously in a selected direction to compress the sensors, so that the cursor is moved continuously in the selected direction.

2. The track ball structure of claim 1, wherein the body includes an upper shell and a base.

3. The track ball structure of claim 1, wherein the body has a button switch.

4. The track ball structure of claim 1, wherein the body has a plurality of button switches.

5. The track ball structure of claim 1, wherein the body has a rolling wheel for scrolling the window of a screen upwards and downwards.

6. The track ball structure of claim 5, wherein the body has a plurality of button switches and the rolling wheel is located between the button switches.

7. The track ball structure of claim 1, wherein the capacity is located on a left side of the body.

8. The track ball structure of claim 1, wherein the capacity is located on a right side of the body.

9. The track ball structure of claim 1, wherein the sensors are button detection devices.

10. The track ball structure of claim 1, wherein the sensors are twelve in number and arranged in a juxtaposed manner in the capacity.

* * * * *